United States Patent
Gelfman

[11] 3,902,643
[45] Sept. 2, 1975

[54] METHOD FOR CUTTING GLASS BOTTLES

[76] Inventor: Ephrem J. Gelfman, 855 Orman Dr., Boulder, Colo. 80303

[22] Filed: Feb. 25, 1974

[21] Appl. No.: 445,219

Related U.S. Application Data

[60] Continuation of Ser. No. 284,600, Aug. 29, 1972, which is a division of Ser. No. 53,741, July 10, 1970, Pat. No. 3,699,829.

[52] U.S. Cl. ............... 225/1; 82/92; 82/47; 225/2 R
[51] Int. Cl. ......... B26f 3/00; B26f 3/02; B23b 3/06
[58] Field of Search............ 225/2 R, 93.5; 65/112; 82/92, 47, 101, 46, 47

[56] References Cited
UNITED STATES PATENTS

| | | | |
|---|---|---|---|
| 566,436 | 8/1896 | Woodruff | 225/1 |
| 610,588 | 9/1898 | Schrader | 225/1 |
| 1,719,588 | 7/1929 | Campbell et al | 65/112 |
| 2,959,507 | 11/1960 | Long | 65/112 X |
| 3,036,405 | 5/1967 | Dwinell et al | 225/93.5 |
| 3,406,886 | 10/1968 | Wesel et al | 65/112 X |
| 3,572,564 | 3/1971 | Fleming | 225/2 R |

Primary Examiner—Harrison L. Hinson

[57] ABSTRACT

A method and apparatus for cutting hollow cylindrical members such as glass bottles includes rotary support structure on which a hollow cylindrical member may be rotated about its axis. The rotary support structure includes axially and laterally spaced support rollers with a pair of laterally spaced of the rollers adjustable toward and away from the other laterally spaced rollers to make a cut of a selected length. One support roller has a cutting edge engageable with the periphery of the supported member during rotation for forming a circular score line with a full revolution thereof. Heat is applied to the member along the score line such as by a flame, and the member is then rapidly cooled such as by quenching with water to effect a break along the score line. The edges at the break are smoothed by sanding with an abrasive material or the like.

4 Claims, 5 Drawing Figures

PATENTED SEP 2 1975  3,902,643
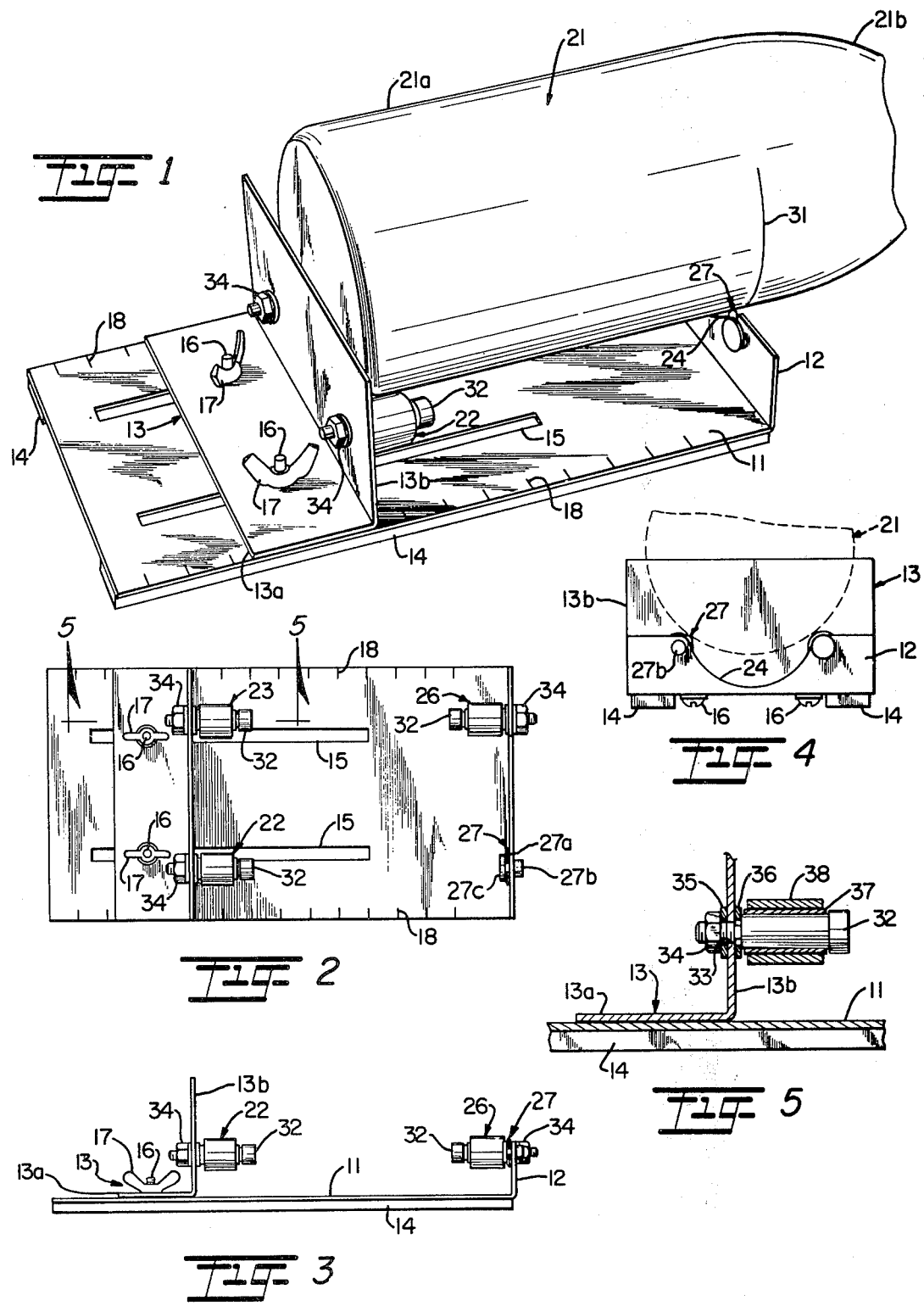

METHOD FOR CUTTING GLASS BOTTLES

This is a continuation application of Ser. No. 284,600, filed Aug. 29, 1972, now abandoned, which application was a divisional application of Ser. No. 53,741, filed July 10, 1970 now U.S. Pat. No. 3,699,829.

This invention relates to a novel and improved method and apparatus for cutting hollow cylindrical members and particularly to method and apparatus for cutting glass bottles in such a way as to remove the upper neck portion and make the bottom portion below the cut into a useful container for other purposes.

Glass bottles are used by suppliers of liquid products and are discarded after the liquid contents have been removed. Presently there is no generally accepted use for discarded glass bottles and as a result they frequently contribute to the problem of littering.

Accordingly, it is a general object of this invention to provide a novel and improved cutting method and apparatus for cutting hollow cylindrical members made of glass or the like.

Another object of this invention is to provide a method and apparatus which is specifically adapted to remove the upper neck portion from a glass bottle and the like in a relatively simple, easy and inexpensive manner and in such a way that the bottom portion below the cut may be used as a container for other purposes.

A further object of this invention is to provide a novel apparatus which will provide a true circular or annular circumferential groove at a selected position between the ends of glass bottles or like cylindrical members of a variety of sizes and shapes.

In accordance with the present invention in a preferred embodiment thereof there is provided a cutting apparatus capable of making a true circular groove or score line in the circumference of a glass bottle or like hollow cylindrical member. This cutting apparatus is principally characterized by axially and laterally spaced rollers to engage the underside of the supported member and support it for rotational motion about its axis. One support roller adjacent an opening in a stationary upright support for the member has a peripheral cutting edge and forms the score line as the supported member is rotated on all of the rollers. The other upright support for the rollers is axially adjustable and positions the member relative to the cutting edge. The supported member is flame-heated or the like and then rapidly cooled to effect a clean break along the score line. The edge along the score line is then smoothed by sanding to remove sharp edges.

Other objects, advantages and capabilities of the present invention will become more apparent as the description proceeds taken in conjunction with the accompanying drawings in which:

FIG. 1 is a perspective view of the cutting apparatus with a glass bottle shown in a supported position thereon;

FIG. 2 is a top plan view of the apparatus shown in FIG. 1;

FIG. 3 is a side elevational view of the apparatus;

FIG. 4 is an end elevational view of the apparatus with the bottle position shown in dashed lines; and FIG. 5 is a fragmentary sectional view taken along lines 5—5 of FIG. 2.

Referring now to the drawings, the cutting apparatus shown comprises support structure in the form of a bed or base plate 11 having a fixed support portion 12 upwardly directed from one end of the plate 11 and a separate movable support member 13 oppositely disposed from the fixed support portion 12, the movable member 13 being slidable along the top planar surface of the base plate toward and away from the fixed support portion 12. The fixed support portion 12 is integral with the base plate and has the same width. The movable support member 13 has an L-shaped cross section including a flat, outturned base portion 13a parallel to the top planar surface of base plate 11 and a flat support portion 13b upwardly directed from base portion 13a which is disposed parallel to portion 12. Resilient cushion strips 14 are mounted under the base plate along each side thereof to cushion the base plate 11.

To facilitate a guided sliding movement for the movable support member 13 along the top of the base plate parallel to the side edges of plate 11 there is provided a pair of spaced, parallel, longitudinal slots 15 located inwardly and parallel to the side edges of the base plate together with a pair of screw bolts 16 extending through the slots 15 from below the base plate 11. Each screw bolt 16 extends upwardly through the slot and then through an aperture in the base portion 13a. A wing nut 17 is threaded on the upper threaded end portion of each bolt and in this way the pair of bolts and wing nuts will firmly hold the movable support member 13 in a selected fixed position with upright portion 13b always parallel to the upright portion 12. A series of equally spaced and oppositely aligned position-indicating indicia lines represented at 18 are provided in the top planar surface of the base plate along the outer side edges at equally spaced intervals to indicate the position of the movable support member 13 on the base plate 11.

Roller structure is provided above the base plate to support a conventional bottle represented at 21 having a lower cylindrical portion 21a and an upper neck portion 21b centered along a common central axis. While a bottle is being shown as one application for the apparatus, it is understood that other hollow cylindrical members of glass or the like may also be cut by the practice of the present invention. This roller structure includes a set of laterally spaced support rollers 22 and 23 mounted on the upstanding portion 13b which extend inwardly toward upstanding support portion 12 with the axes of rollers 22 and 23 arranged parallel to one another. These rollers are positioned an equal distance from the center of the upstanding portion 13a and are disposed on opposite sides of a vertical line through the axis of the bottle supported thereon.

The fixed support portion 12 has a central, circular upwardly directed opening or slot 24 for receiving a portion of the bottle oppositely of the bottom thereof. A pair of support rollers arranged coaxially with the first pair includes a roller 26 mounted to the inside of the slot 24 and it is coaxially aligned and axially spaced from movable roller 23. The peripheral surface of roller 26 is beyond the edge of the slot 22 and above the top edge of the upright support portion 12 so that the bottle is supported above or clears the upright support portion. The other support roller 27 of the second set is in the form of a conventional cutter blade which has a center axis defined by a support shaft 27b which is axially spaced from and coaxially aligned with roller 22 and comprises a plurality of cutter wheels 27a mounted for free rotation on individual shafts on a hub 27c. These cutter wheels have axes arranged on a common radius outwardly of the center axis at equal circumferentially spaced intervals and the periphery of each wheel 27a extends beyond the top edge and the circular edge of the upright support portion 12. The hub 27c will rotate on shaft 27b. Thus rollers 22, 23, 26 and the radially arranged rollers 27a form four spaced supports, with two at axially spaced positions on opposite sides of the bottle. In the operation of the apparatus, after the length has been set the bottle is rotated a complete revolution and this produces a circular score line in the wall of the bottle represented at 31 which is a true circle.

The construction of support rollers 22, 23 and 26 may take a variety of forms but as shown in the drawings includes a flat-headed bolt 32 with a threaded end portion. The bolt 32 extends through an aperture 33 in its associated upright support portion. A nut 34 threads on the outer threaded end and a pair of washers 35 and 36 are positioned on the bolt on each side of the upright support portion. A central shank section of the bolt carries a metal roller sleeve 37 on which there is mounted a resilient frictional cover sleeve 38 of rubber or the like which contacts the peripheral surface of the bottle and affords a relatively broad frictional surface area in engagement with the bottle.

In a preferred procedure for cutting the glass bottle shown, the length of cut is first set by adjusting the distance between support portions 12 and 13a by sliding member 13 to a selected position on the base plate and then tightening the wing nuts 17. The bottle 21 is placed in a rotative supported position on the rollers as shown in FIG. 1 with the bottom of the bottle being placed against the support portion 13a. The bottle is then rotated a full revolution or complete pass so as to form a circular groove represented at 31 which is a true circumference of a cylinder and at right angles to the longitudinal axis thereof. After the circular score line is formed, heat is applied to the bottle along the score line. The heat may be applied with an open flame such as, for example, with a candle or this may be accomplished with hot water near boiling temperatures such as running it under a tap while rotating the bottle. The heated bottle is then rapidly cooled such as with cold water so that the rapid contraction effects a clean break in the bottle along the score line to separate the neck portion from the bottom portion. The edges of the bottle along the score line, for the bottom portion, are then smoothed to remove any sharp edges by sanding or grinding. This may be accomplished by a fine wet or dry sandpaper using a silicon carbide, aluminum oxide or other glass grinding powder with water for wetting to provide a smooth rounded upper edge. The bottom portion is then in the form of an open glass-type container which may be used for a variety of purposes.

Although the present invention has been described with a certain degree of particularity, it is understood that the present disclosure has been made by way of example and that changes in details of structure may be made without departing from the spirit thereof.

What is claimed is:

1. The method of making a glass-type container from a glass bottle having a cylindrical portion terminating in a closed end and a neck portion terminating in an open end comprising the steps of resting the bottle for rotation about its longitudinal axis with the cylindrical portion disposed upon axially and laterally spaced positions of rollable support beneath the bottle, positioning said axially and laterally spaced positions of rollable support to engage the cylindrical portion of the bottle with the longitudinal axis of the bottle extending in a substantially horizontal direction, rotating and exerting a downward pressure on the bottle with the external bottle surface in engagement with an underlying cutting edge spaced beneath the longitudinal axis which defines one of the spaced positions of rollable support to form a score line in the external surface thereof, then applying heat to the bottle along the score line and rapidly cooling the bottle along the score line to effect a separation into two parts at the score line.

2. The method according to claim 1 further characterized by supporting the bottle for rotation at axially and laterally spaced positions along the underside of the cylindrical portion of the bottle.

3. The method according to claim 1 further characterized by frictionally engaging the bottle at the axially and laterally spaced positions of rollable support.

4. The method according to claim 1 further characterized by supporting the closed end of the bottle to prevent axial movement of the bottle in a direction toward the closed end as the bottle is rotated.

* * * * *